United States Patent
Parlikar et al.

(10) Patent No.: US 9,508,341 B1
(45) Date of Patent: Nov. 29, 2016

(54) ACTIVE LEARNING FOR LEXICAL ANNOTATIONS

(71) Applicant: Amazon Technologies, Inc., Seattle, WA (US)

(72) Inventors: Alok Ulhas Parlikar, Somerville, MA (US); Andrew Jake Rosenbaum, Somerville, MA (US); Jeffrey Paul Lilly, Seattle, WA (US); Jeffrey Penrod Adams, Tyngsborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 14/476,075

(22) Filed: Sep. 3, 2014

(51) Int. Cl.
  *G10L 15/18* (2013.01)
  *G10L 13/00* (2006.01)

(52) U.S. Cl.
  CPC ............. *G10L 15/18* (2013.01); *G10L 13/00* (2013.01)

(58) Field of Classification Search
  None
  See application file for complete search history.

(56) References Cited

U.S. PATENT DOCUMENTS

| | | | | |
|---|---|---|---|---|
| 6,389,394 B1* | 5/2002 | Fanty | ................... | G10L 15/187 704/249 |
| 6,535,853 B1* | 3/2003 | Reitano | ................... | G10L 17/26 434/156 |
| 2007/0083369 A1* | 4/2007 | McCuller | ............. | G10L 15/187 704/254 |
| 2013/0179170 A1* | 7/2013 | Cath | ...................... | G10L 13/08 704/260 |
| 2015/0095031 A1* | 4/2015 | Conkie | ................ | G10L 15/187 704/254 |

* cited by examiner

*Primary Examiner* — Pierre-Louis Desir
*Assistant Examiner* — Jonathan Kim
(74) *Attorney, Agent, or Firm* — Knobbe Martens Olson & Bear LLP (57) ABSTRACT

Features are disclosed for active learning to identify the words which are likely to improve the guessing and automatic speech recognition (ASR) after manual annotation. When a speech recognition system needs pronunciations for words, a lexicon is typically used. For unknown words, pronunciation-guessing (G2P) may be included to provide pronunciations in an unattended (e.g., automatic) fashion. However, having manually (e.g., by a human) annotated pronunciations provides better ASR than having automatic pronunciations that may, in some instances, be wrong. The included active learning features help to direct these limited annotation resources.

28 Claims, 7 Drawing Sheets

| Word | Pronunciation | Pron. Type | G2P Info | Annotator |
|---|---|---|---|---|
| drew | D-R-UW | Manual | | John |
| rose | R-OW-Z | Automatic | 0.9 | |
| rose | R-AO-Z | Automatic | 0.8 | |

ACTIVE LEARNING FOR LEXICAL ANNOTATIONS

BACKGROUND

Computing devices can be configured to process a user's spoken commands, requests, and other utterances into written transcriptions. Models representing data relationships and patterns, such as functions, algorithms, systems, and the like, may accept audio data input (sometimes referred to as an input vector), and produce output (sometimes referred to as an output vector) that corresponds to the input in some way. In some implementations, a model is used to generate a probability or set of probabilities that the input corresponds to a particular language unit (e.g., phoneme, phoneme portion, triphone, word, n-gram, part of speech, etc.). For example, an automatic speech recognition ("ASR") system may utilize various models to recognize speech, such as an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance.

Models are typically based on a lexicon. A lexicon generally refers to a compendium of words and associated pronunciations. Words in the lexicon may be manually annotated with the pronunciation information by, for example, a professional linguist. As this process can be resource intensive (e.g., time, labor, expense), some words may be automatically annotated using pronunciation prediction. In some implementations, the prediction may be based on a grapheme-to-phoneme (G2P) model. Given the volume of new words that may be included in a given lexicon and the accuracy of the G2P model, a need exists to efficiently and accurately identify words which, through manual annotation, can improve the overall system performance.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure

DETAILED DESCRIPTION

Introduction

When a speech recognition system needs pronunciations for words, a lexicon is typically used. For unknown words, pronunciation-guessing (G2P) may be included to provide pronunciations in an unattended (e.g., automatic) fashion. However, having manually (e.g., by a human) annotated pronunciations provides better ASR than having automatic pronunciations that may, in some instances, be wrong. As noted above, one problem is that manually annotating words with pronunciations is resource intensive task. Below, features are described which include active learning to identify the words which are likely to improve the guessing and ASR with manual annotation.

Consider a system including a lexicon that is already annotated, such as a catalog of media items, products, or grocery items. As new products become available in the catalog, a large list of new words that require annotations to support speech recognition for the catalog items may be produced. To avoid delaying the introduction of products with problematic pronunciations and/or excluding products from being available via speech recognition, the features described below are included to identify words in the new word list that yields significant ASR improvements. The proposed features include active learning for the lexical annotation task.

In one aspect, a hand curated lexicon for annotated words is used and G2P for the rest of the words. Confidence information may be assigned to unseen (e.g., new) words in terms of how hard the G2P thinks they are. If a word is hard for G2P, it is likely that the pronunciation produced by G2P is wrong. This confidence information in conjunction with any available ASR metrics (e.g., the frequency of the new word in the context of our ASR system; number of user corrections) to identify the "critical" words that need immediate attention (e.g., manual annotation). These are words that are very frequent in our speech recognition system, but difficult from a G2P point of view. The features thereby prioritize these frequent and difficult words for lexical annotation, thereby effectively deploying manual annotation resources. G2P on the rest of the word list until they are identified for manual annotation later. After each new "batch" of manual annotations, G2P model may be retrained using the new annotations. Because the batch of words were selected based on the difficulty and frequency, the resulting retrained G2P will be better at predicting more words and ASR can use the new manual annotations for recognizing the new batch of words rather than relying on the G2P predicted pronunciation.

Although the examples and implementations described herein focus, for the purpose of illustration, on using active learning for lexical annotation in an automatic speech recognition context, one skilled in the art will appreciate that the techniques described herein may be applied to other processes, methods, or systems. For example, the techniques may be used with other types of modeling systems which include automatic and manual inputs to generate a prediction model used for purposes other than automatic speech recognition or natural language understanding, etc. Various aspects of the disclosure will now be described with regard to certain examples and embodiments, which are intended to illustrate but not limit the disclosure.

Active Learning System Overview

Figure 1:
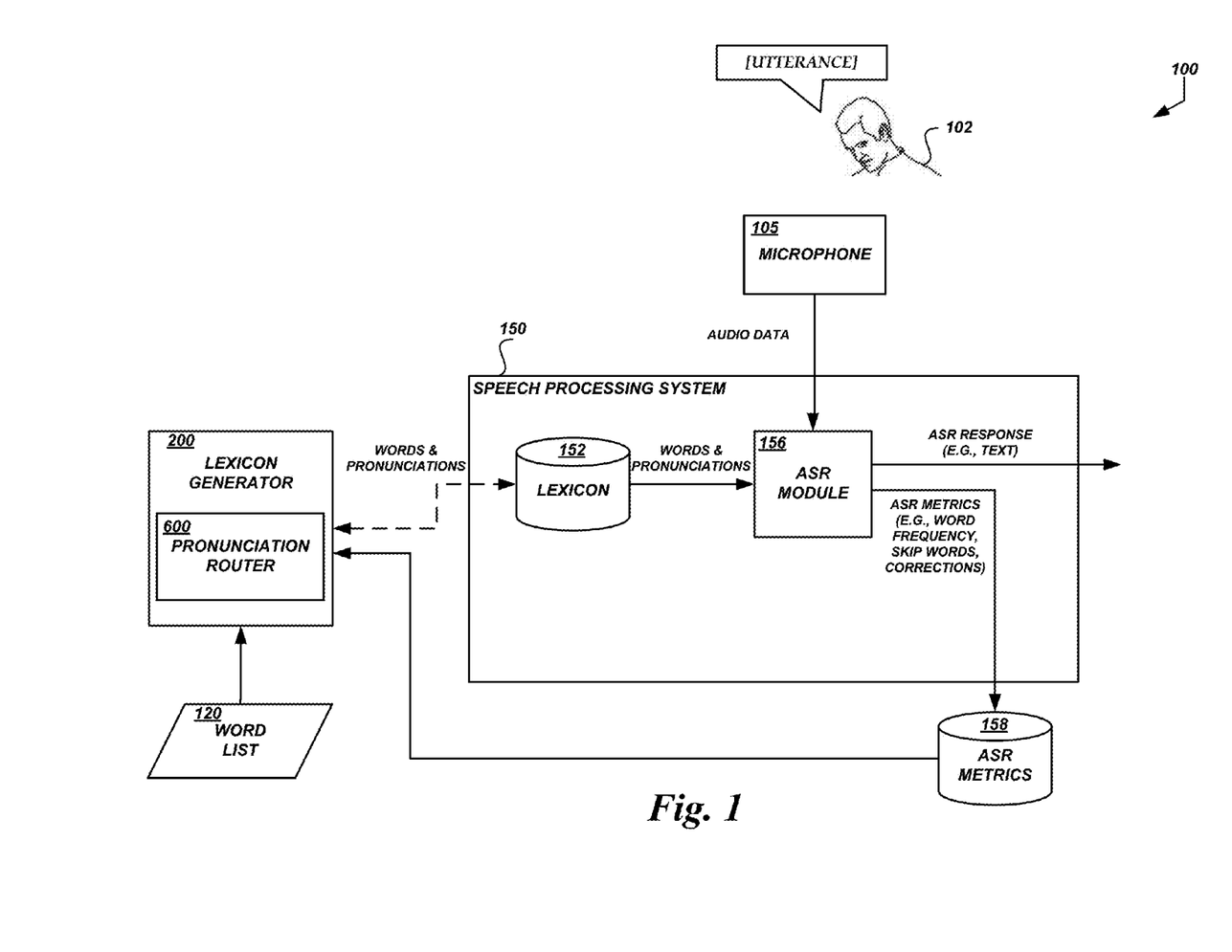
FIG. 1 is a network diagram of an example of a system incorporating active learning for lexical annotations.

FIG. 1 is a network diagram of an example of a system incorporating active learning for lexical annotations. As shown, a user 102 may make an utterance, and audio data of the utterance may be obtained by the speech processing system 150 via a microphone105. The speech processing system 150 may include an ASR module 156 configured to process the audio data to generate an ASR response to the utterance. A text transcription of the utterance is one example of such an ASR response.

The ASR module 156 may be configured to base its response on a lexicon 152. The lexicon 152 includes words and associated pronunciations. The ASR module 156 may be configured to compare the received audio data with the pronunciations included in the lexicon 152 to recognize the utterance.

In addition to generating a response, the ASR module 156 may be configured to generate ASR metrics 158. The ASR metrics 158 may include word frequency (e.g., how often a word was presented to the ASR module 156), word corrections (e.g., how often a "recognized" word was corrected by the user), skip words (e.g., words which were omitted from recognition) and the like. The ASR metrics 158 may be stored in memory for further processing as described herein. The memory is in data communication with the ASR module 156.

The memory for the ASR metrics 158 is also in data communication with a lexicon generator 200. The lexicon generator 200 is configured to generate the lexicon 152 for a word list 120. The lexicon generator 200 receives the word list 120 and provides, as one output, a list of words and pronunciations. The pronunciations may include information about the pronunciation such as whether the pronunciation for a word was manually generated or automatically generated. To determine whether a word in the word list 120 is annotated manually or automatically, a pronunciation router 600 may be included in the lexicon generator 200. The pronunciation router 600 is configured to select words for manual annotation. The pronunciation router 600 may be configured to identify an annotation route for the manual annotation. For example, one annotator may be well trained in words of French origin. Accordingly, a word identified for manual annotation may be routed to this annotator.

As words are introduced to the system 100, the lexicon 152 may be updated with manually and automatically generated pronunciations for the new words. As the lexicon 152 is updated, the ASR module 156 is configured to incorporate the pronunciations for speech recognition and provide additional ASR metrics 158 on the performance. This information, in turn, can be fed back to the lexicon generator 200 to further identify words for manual annotation that will improve the system 100.

It will be appreciated that the lexicon generator 200 and the speech processing system 150 may operate independently such that the speech processing system 150 may use lexical information provided by the lexicon generator 200, but the use may not be sequential. It will also be appreciated that although the lexicon 152 generated by the lexicon generator 200 is described with reference to speech processing, the active learning techniques may be applicable to generating a lexicon for other purposes.

A Lexicon Generator—Green Field Scenario

Figure 2:
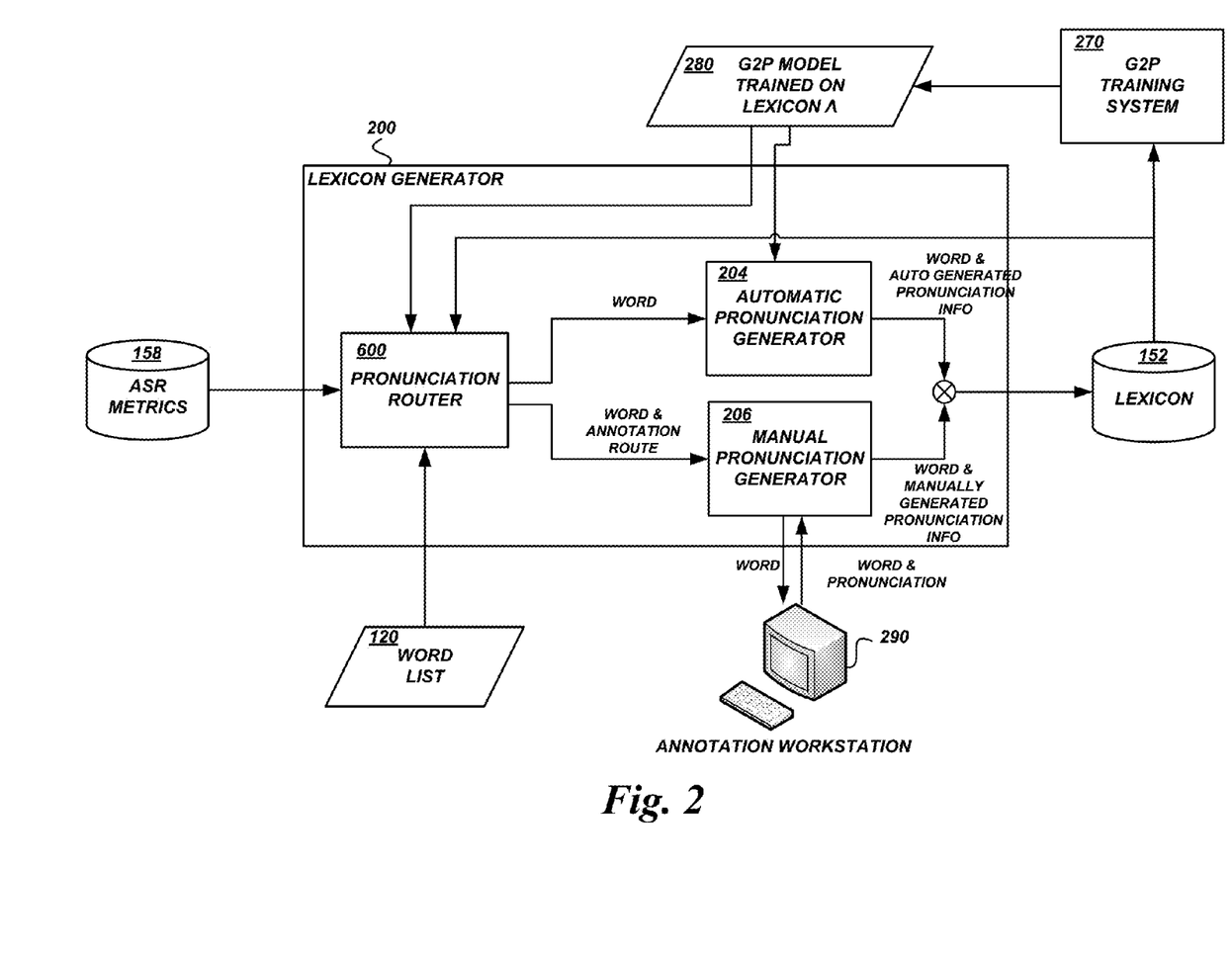
FIG. 2 is a functional block diagram of an example of a lexicon generator.

FIG. 2 is a functional block diagram of an example of a lexicon generator. In a green field scenario, the word list 120 provided to the lexicon generator 200 may include words which are not included in a lexicon. Accordingly, the lexicon generator 200 is configured to generate the lexicon 152 through a combination of automatic pronunciation generation and manual pronunciation generation.

An automatic pronunciation generator 204 may be included in the lexicon generator 200. The automatic pronunciation generator 204 may be configured to receive a G2P model 280 for auto-generation of pronunciations of the words presented to the automatic pronunciation generator 204. The G2P model 280, in a green field scenario, may be a general G2P model which will be refined through active learning as described herein.

A manual pronunciation generator 206 may be included in the lexicon generator 200. The manual pronunciation generator 206 may be in data communication with an annotation workstation 290. The annotation workstation 290 may receive words from the manual pronunciation generator 206. Via the annotation workstation 290, pronunciation information for the word may be collected. For example, the word may appear on a display included in the annotation workstation 290. Using one or more input devices such as a mouse, keyboard, stylus, touchscreen, etc. an annotator may provide annotation information for the word. The received annotation information is then transmitted to the manual pronunciation generator 206 for inclusion in the lexicon 152.

Directing the traffic of words from the word list is the pronunciation router 500. In the green field example, no ASR metrics may be available for the words because the words are truly unseen words. In some implementations, some ASR metrics may be available such as lexical word frequency identifying how often within the lexicon 152 a word can be expected to appear. The lexical word frequency may be different than the word frequency identifying how often the speech recognition system 150 receives audio data associated with a given word. In theory, these numbers should correlate. However, in some implementations, the two metrics may be independent of each other.

Once the initial lexicon is generated, the G2P model 280 may be retrained using the lexicon of pronunciations. A G2P training system 270 may be included to retrain the model 280. By including the newly manually annotated words, the retrained G2P model may provide a higher accuracy than the previous G2P model because of the increased number of manually annotated words. The training process generally includes looking at words which have been manually annotated. Using these words as a "ground truth," the training process then aligns the characters of the unknown words to the phonemes of the annotated words. The alignment may be achieved, in some implementations, using an expectation maximization process. Once aligned, a language model may be trained by generating probabilities for letters that a given phoneme will be "correct" based on the context of the characters (e.g., proximity of a two letter pair) included in the words. For example, similarities between the manually annotated words and words for which a prediction is needed. The similarities which may be used as the basis for the model include similar language models, probabilities of the same n-grams of letters where n is 2, 3, or 4 (for example). The similarities may include a number of sounds which correspond between the manually annotated word and the guessed word. For a given n-gram, the highest match may correspond to a 4-gram match, and thus be associated with a high confidence in the match. The confidence may decrease as the size of n is reduced to reflect the potential for alternative combinations of the grams in different words. The alignment of the unknown words with the manually annotated words may be statistically driven such as including Viterbi, Baum-Welch, weighted finite state transducer, machine translation, and/or similar processing features.

A Lexicon Generator—Retraining Scenario

Retraining the G2P model 280 includes identifying how difficult words in the lexicon 152 are for the G2P model 280 to predict. In the retraining scenario, the word list 120 provided to the lexicon generator 200 includes words from a curated lexicon, that is, a lexicon with manually annotated words, previously generated. The curated words may be processed automatically via the G2P model 280 to determine how accurate the G2P model 280 is. The accuracy is determined in part by comparing the predicted pronunciation from the G2P model 280 to the manual annotations for the same word.

By comparing the G2P model 280 pronunciation with the "ground truth" pronunciation, confidence information in the G2P model 280 may be generated. For example, each word in the word list 120 (e.g., manually annotated word) is labeled as yes/no, whether previously trained G2P model 280 would have correctly guessed the pronunciation for each word. For each word, G2P prediction information may be obtained. The G2P prediction information can include one or more of a G2P output prediction score, one or more n-best scores (e.g., score for best prediction, score for second best prediction, score for third best prediction, etc.), score of how similar the word is to existing words within the lexicon (e.g., character language model score), a score of how fluent the lexicon is in the output pronunciation (e.g., phoneme language model score), word length, output pronunciation length or combinations of one or more of these (e.g., difference between nbest1 and nbest2 score, length plus G2P output prediction score). Using the G2P prediction information, confidence information for the G2P model can be generated. The confidence information indicates how confident the model thinks that G2P based on the G2P model 280 will perfectly guess the pronunciation of a word. In some implementations, the confidence information may be expressed as a regression model taking the G2P prediction information as inputs to generate a confidence score for a predicted pronunciation for the word.

The pronunciation router 500 may be configured to receive the confidence information along with ASR metrics 158 to determine which words in the word list 120 should be automatically annotated by the automatic pronunciation generator 204 using the G2P model 280 or manually annotated by the manual pronunciation generator 206. In retraining mode, the word list 120 may be the same word list provided for the green field scenario. That is, the initial word list used to generate the lexicon for the G2P model 280 is being re-processed to consider the confidence information during routing. Further details of the active learning, routing, and the pronunciation router 500 are provided below.

Once the pronunciations are updated in the lexicon 152, the G2P model 280 may be retrained. The retraining may include the updated manually annotated words. Because the lexicon 152 now includes manual pronunciations for words which had low confidence scores, the overall confidence for the G2P model 280 may improve.

Example Retraining Processes

A G2P model will generally provide one or more pronunciations for a word and some confidence information for the predicted pronunciation. This confidence information provides a narrow view of the ability of the G2P model to predict the associated word. This confidence information may be accurate in that the confidence value correlates with the "correctness" of a prediction. However, in some instance, such as when words including letter combinations which have not appeared in a lexicon or have appeared with a low frequency in a lexicon, the confidence value may be reported high because of a false-positive identification. Conversely, some confidence values may be under-reported due to a linguistic subtlety that prevents the G2P model from correlating two similar words.

Therefore, in one respect, the active learning features described include generating a prediction performance model for the G2P model. This performance model may be generated based on a comparison of an automatically predicted pronunciation of a word with a manually provided pronunciation. Using the model, the predicted pronunciation, and the confidence information generated by the G2P model, an annotation priority can be generated which provides a holistic indication of the quality of prediction for words in relation to the G2P model.

Figure 3:
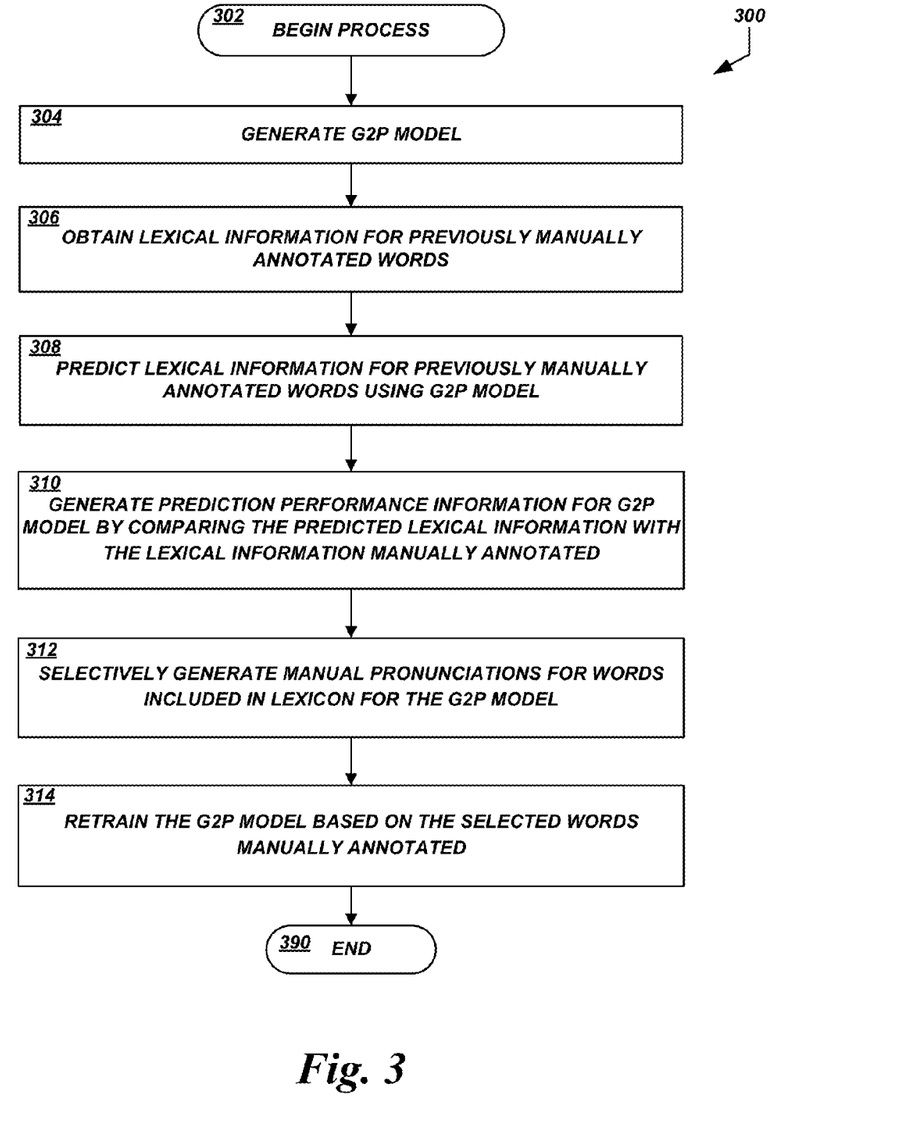
FIG. 3 is a process flow diagram of an example method of active learning for lexical annotations.

FIG. 3 is a process flow diagram of an example method of active learning for lexical annotations. The process 300 shown in FIG. 3 may be implemented in whole or in part by the lexicon generator 200 shown in FIG. 1 or 2.

The process 300 begins at block 302. At block 304, a G2P model is generated. The generation of a G2P model may be performed by a G2P training system such as the G2P training system 270 shown in FIG. 2.

At block 306, lexical information for previously manually annotated words is obtained. The words may be obtained from static memory such as a disk drive, or via a network (e.g., cloud storage). The lexicon may include hundreds, thousands, or hundreds of thousands of words.

At block 308, lexical information for the previously manually annotated words is predicted. The prediction generated using the G2P model generated at block 304. The lexical information includes a predicted pronunciation for the word. The lexical information may also include one or more of a G2P output prediction score, one or more n-best scores (e.g., score for best prediction, score for second best prediction, score for third best prediction, etc.), score of how similar the word is to existing words within the lexicon (e.g., character language model score), a score of how fluent the lexicon is in the output pronunciation (e.g., phoneme language model score), word length, output pronunciation length or combinations of one or more of these (e.g., difference between nbest1 and nbest2 score, length plus G2P output prediction score).

At block 310, prediction performance information for the G2P model is generated. The prediction performance information is generated by comparing the predicted lexical information with the lexical information manually annotated. Specifically, the pronunciation generated automatically by the G2P model is compared to the manually provided pronunciation for the word. The comparison may include generating a matching score indicated the degree to which the pronunciations match. For example, the comparison may include matching the number of prons, matching prons at given for positions, identifying prons near given positions, and the like. The comparison may include the G2P model lexical information. In some implementations, the prediction performance information may be summarized using a prediction performance model such as a regression model. Such a regression model may receive one or more of the lexical information elements described above to generate an annotation priority.

At block 312, manual pronunciations are selectively generated for words included in the lexicon for the G2P model. The words may be words previously included in the lexicon or words which are being added to the lexicon generated by the G2P model. The selection may be based on the annotation priority for the predicted pronunciations for the words. The selection may be based on one or more ASR metric, such as linguistic frequency, presentation frequency, skip rate, correction rate, or some combination thereof. If a word is selected for manual annotation, it can be routed to an annotation workstation. If a word is selected for automatic pronunciation generation, it may be routed to the automatic pronunciation generator. In some implementations, as the word was previously annotated automatically, it may be desirable to skip further processing of a word that is not selected until the G2P model is retrained.

At block 314, the G2P model is retrained. The retraining process includes the newly manually annotated words. By retraining the G2P model using the newly manually annotated words, the overall performance of the G2P model may be improved because the training will be based on a higher number of words with manual annotations. Furthermore, the speech recognition system which uses the lexicon generated by the G2P model may be improved because the words manually annotated in the lexicon will provide an accurate pronunciation for words which were identified as "important" (e.g., frequently used) by the speech recognition system.

At block 390, the process 300 may end. It will be appreciated that the process 300 may be iteratively performed by returning to block 306 as described above.

Figure 4:
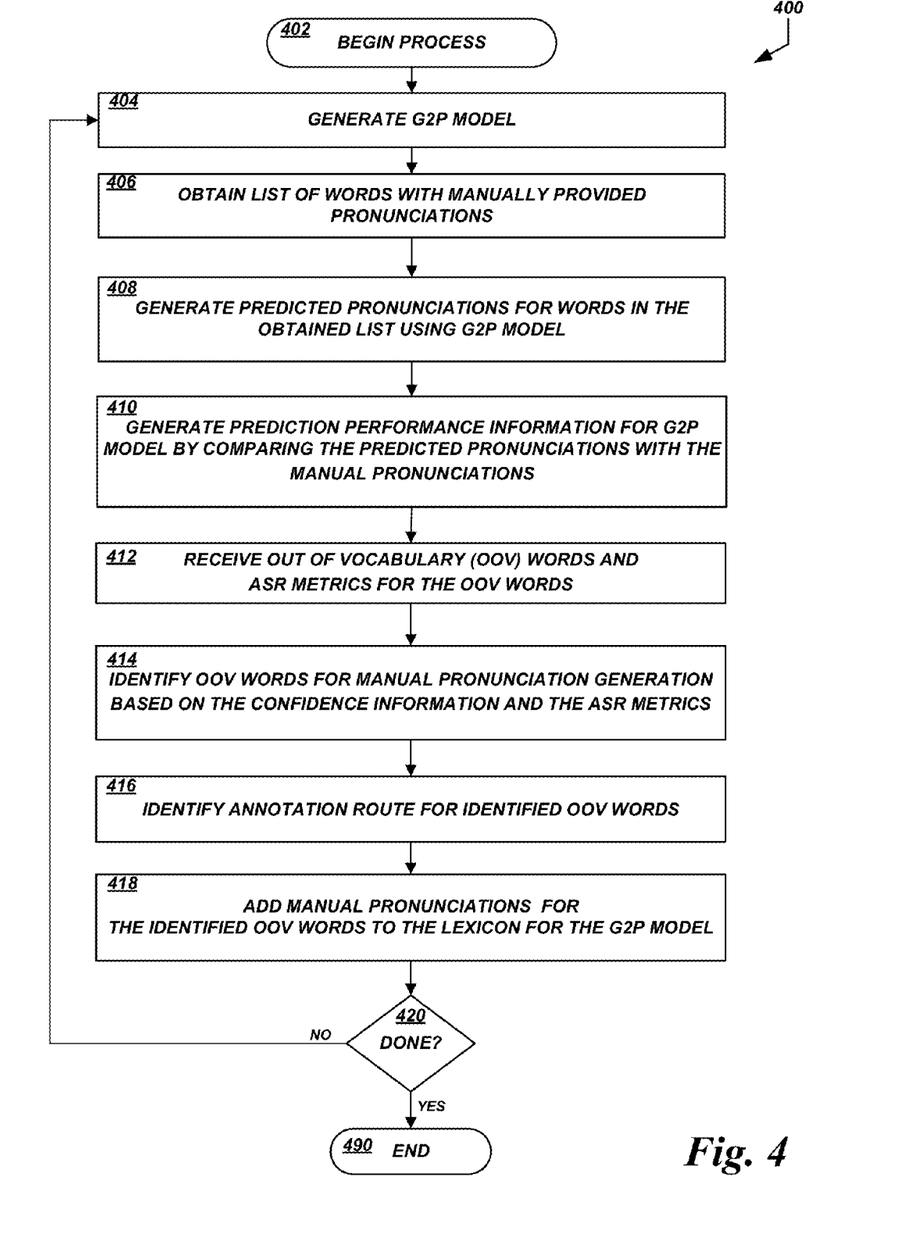
FIG. 4 is a process flow diagram of another example method of active learning for lexical annotations.

FIG. 4 is a process flow diagram of another example method of active learning for lexical annotations. The process 400 shown in FIG. 4 may be implemented in whole or in part by the lexicon generator 200 shown in FIG. 1 or 2. The process shown in FIG. 4 is similar to that shown in FIG. 3. In FIG. 4, details are provided to illustrate an implementation of the retraining and routing.

The process 400 begins at block 402. At block 404, a G2P model is generated. The generation of a G2P model is generally understood in the art.

At block 406, a list of words with manually provided pronunciations is obtained. The words may be obtained from static memory such as a disk drive, or via a network (e.g., cloud storage). The list may include hundreds, thousands, or hundreds of thousands of words.

At block 408, predicted pronunciations for words in the obtained list from block 406 are generated using the G2P model generated at block 404. At block 410, prediction performance information for the G2P model from block 404 is generated. The prediction performance information is generated by comparing the manual pronunciations with the predicted pronunciations. The comparison may include counting the number of elements (e.g., prons) for a given word, the number of matching elements for a given word, absolute match (e.g., exact identity of pronunciations), features of the phonemes included in the respective pronunciations, differences between phonemes (e.g., a weighted difference metric), confusability of a predicted pronunciation with other pronunciations in the lexicon, alternate pronunciations for a given word (e.g., the fourth best pronunciation automatically generated was actually the manual annotation), or a metric based on a combination of these or similar pronunciation data elements. In some implementations, the prediction performance information may be summarized using a model such as a regression model. Such a regression model may receive one or more of the lexical information elements described above to generate an annotation priority.

At this point, the process 400 has a G2P model and prediction performance information which can be used to generate a value identifying a degree of accuracy for a predicted pronunciation provided by the G2P model.

At block 412, out of vocabulary (OOV) words are received. In some implementations, automatic speech recognition (ASR) metrics may also be received for at least some of the words received. ASR metrics may include the frequency of the new word in the linguistic context of our ASR system, number of user corrections, domain priority (e.g., specific words which have a systemic importance such as in support of a new product release) and/or frequency of the word being presented to the ASR system. The information at block 412 may be received via wired, wireless, or hybrid wired and wireless means. The received information may be stored in a memory for further processing consistent with the aspects described.

At block 414, a portion of the OOV words are identified for manual pronunciation generation. The identification is based on the predicted pronunciation for a given word, the confidence information for a predicted pronunciation for the given word provided by the G2P model, and the performance prediction model for the G2P model. The identification may be based on the ASR metrics for a given word. For example, suppose the confidence information is expressed as a regression model. Such a regression model provides a regression value for each OOV word. The regression model may consider the predicted pronunciation alone or in conjunction with G2P prediction information as discussed above.

The list of words may be sorted by annotation priorities, such as from highest priority to lowest priority. In some implementations, a predetermined number of words from the top (e.g., highest priority) of the list will be identified for manual annotation. The predetermined number may be based on the number of annotation resources available. The predetermined number may consider the number of words pending manual annotation whereby a threshold maximum number of words handled by the manual annotation system is defined. Once the threshold is met, no further words are provided to the manual annotation system until the backlog is processed through the manual annotation system.

If ASR metrics are provided, additional refinements to the identification may be included. For example, the annotation priority (e.g., regression score) may be weighted by one or more ASR metric. An example of weighting may be multiplying the annotation priority by the frequency of each word. The words may then be sorted and a predetermined number identified for manual annotation as described above.

Another refinement may include filtering the word list. For example, the list may be sorted by an ASR metric (e.g., frequency). Words that have annotation priorities below a predetermined threshold may be removed as candidates for manual annotation. Such a low priority indicates that the G2P model is sufficiently confident and the predicted pronunciation may be used. The threshold for removing candidates may be statically defined (e.g., a priority associated with 80% prediction accuracy confidence or higher will be skipped). In some implementations, the threshold for removing candidates may be dynamically determined. For example, the threshold may consider the number of iterations of training for a given G2P model whereby for each iteration, a priority indicating a higher level of confidence is used than was used for the previous iteration on the assumption that the model improves over time.

It will be appreciated that the filtering and identification features described may be combined or separated to provide a variety of implementations.

At block 416, an annotation route for the words identified for manual annotation at block 414 is identified. All manual annotators are not the same. Some annotators may have an expertise in a region, dialect, language, or other linguistically significant factor that impacts the quality of the manual annotation. These linguistic factors for the available annotators may be stored in a memory. Once words have been identified for manual annotation, the words may be further processed to identify which annotator is best suited to annotate the word. The identification at block 416 may include extracting linguistic factors for a word and searching for an available annotator to route the word to.

In some implementations, the workload of a given annotator may also be considered. For example, some annotators may work faster than others. As such, words may be routed based on a queue size for a given annotator such that the work is distributed evenly across annotators. In some implementations, the distribution may consider the number of words alone or in conjunction with characteristics of the words. For example, long words may require more word than shorter words. As such, the routing may identify a route which ensures the queued work is evenly distributed.

At block 418, manual pronunciations are added to the lexicon which was used to train the G2P model at block 404. At decision block 420, a determination is made as to whether the training process is done. The completion determination may be whether the manual annotation system has exhausted transcribing resources (e.g., annotators, memory space, bandwidth). The completion determination may be based on whether a predetermined portion of the OOV words have been transcribed (e.g., sum of the frequency of each word we think we have correct). The completion determination may be based on the confidence information. In some implementations, the completion may be based on time. For example, if a new lexicon is being generated for a product launch date, it may be desirable to repeat the process 400 based on time by comparing the current time at the determination with a launch date. If time permits (e.g., another training iteration may be completed before the launch date), the determination at block 420 may be negative. Other stopping conditions which may be considered in the alternative or in conjunction with another condition include: overall accuracy of the G2P model as compared to the manual annotation, overall accuracy of the ASR as identified by the ASR metrics when little or no incremental improvements are identified between iterations.

If the determination at block 420 is negative, the process 400 returns to block 404 as described above. If the determination at block 420 is positive, the process 400 ends at block 490.

Figure 5:
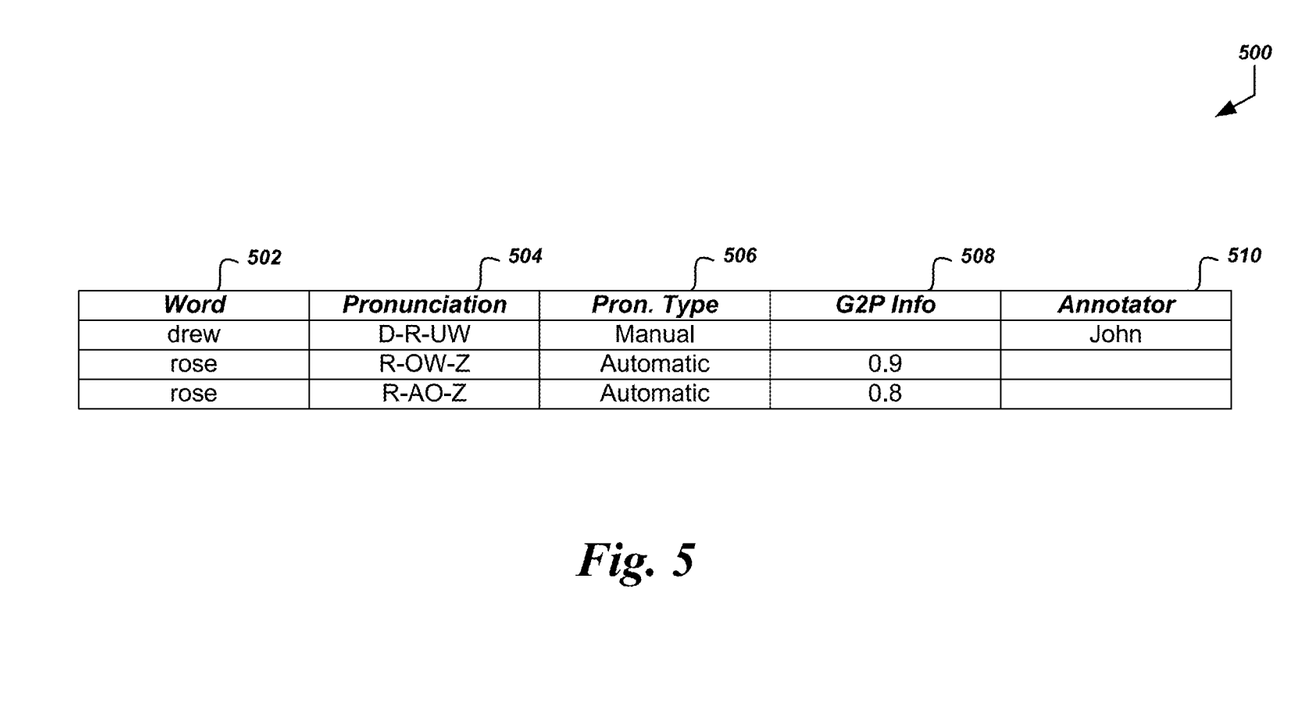
FIG. 5 is a table illustrating an example of a lexicon.

FIG. 5 is a table illustrating an example of a lexicon. The lexicon 500 shown is an example of how a lexicon may be organized. It will be appreciated that the information may be organized differently while retaining a similar set of relationships and conveying similar information.

The lexicon 500 includes four columns, a word column 502, a pronunciation column 504, a pronunciation type column 506, a G2P information column 508, and an annotator column 510. The word column 502 includes values for words included in the lexicon 500. The lexicon 500 shown in FIG. 5 includes two words: "drew" and "rose." The pronunciation column 504 includes pronunciation for the words. Each pronunciation is associated with a word. As shown in FIG. 5, the word "drew" is associated with one pronunciation while the word "rose" is associated with two different pronunciations. As discussed above, a pronunciation may be manually or automatically generated. The pronunciation type column 506 includes a value indicating whether the associated pronunciation was manually or automatically generated. In some implementations, the value may be a binary flag whereby one value indicates manual pronunciation and the other value indicates automatic pronunciation. The G2P information column 508 includes information about the pronunciation that was generated. In the case of an automatic pronunciation, the pronunciation information column may include G2P prediction information, confidence score, or both. The annotator column 510 may include information identifying the annotator who transcribed the pronunciation. Additional information about the manual annotation may be associated with a word such as the time of annotation, the annotation route, the length of time spent manually annotating the word, and the like.

A Pronunciation Router

Figure 6:
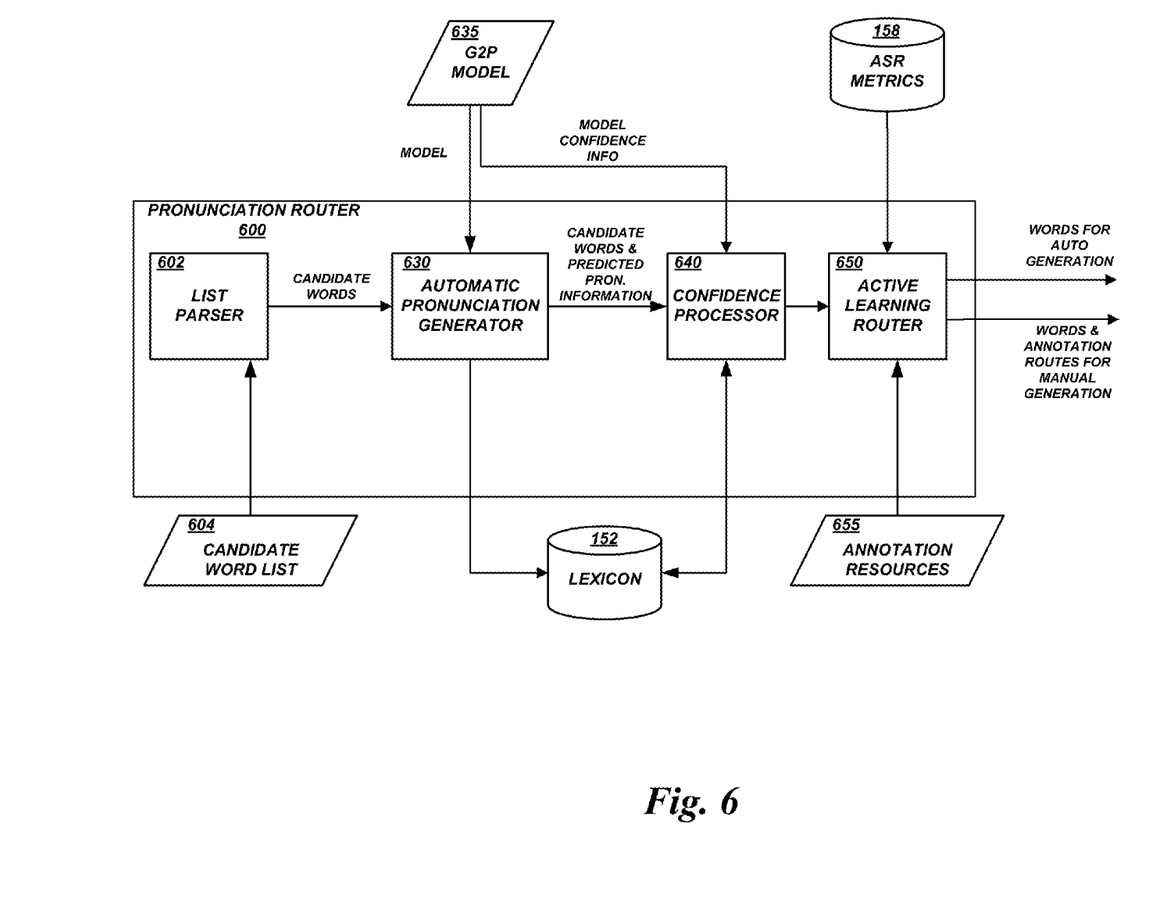
FIG. 6 is a functional block diagram of an example of a pronunciation router.

FIG. 6 is a functional block diagram of an example of a pronunciation router. The pronunciation router 600 may be included in the lexicon generator 200. The pronunciation router 600 is configured to select words for manual annotation such as described in FIGS. 3 and 4. The pronunciation router 600 may be configured to identify an annotation route for the manual annotation such as described in FIG. 4. For example, one annotator may be well trained in words of French origin. Accordingly, a word identified for manual annotation may be routed to this annotator.

The pronunciation router 600 receives a candidate word list 604. The candidate word list 604 includes words for annotation. The pronunciation router 600 will determine whether the words included in the candidate word list 604 should be manually annotated or automatically annotated. The candidate word list 604 may be provided in a machine readable format such as a comma separated list, a token separated list, or a spreadsheet.

The candidate word list 604 is provided to a list parser 604 included in the pronunciation router 600. The list parser 604 is configured to parse words from the candidate word list 604. The parsing may be unattended, that is, without human intervention.

Candidate words are provided by the list parser 604 to an automatic pronunciation generator 630. The automatic pronunciation generator 630 may be similar to the automatic pronunciation generator 204 described above with reference to FIG. 2. As shown in FIG. 6, the automatic pronunciation generator 630 receives a G2P model 635 for auto-generation of pronunciations of the candidate words presented to the automatic pronunciation generator 204. The automatic pronunciation generator 630 also provides pronunciation information such as the G2P prediction information for the predicted pronunciation. In some implementations, the predicted pronunciation and G2P prediction information may be stored in the lexicon 152.

The candidate words and the predicted pronunciation information are provided to a confidence processor 640. The confidence processor 640 is configured to receive prediction performance information for the G2P model 635. The prediction performance information indicates an overall confidence for a prediction provided by the G2P model 635. The prediction performance information may, in some implementations, be expressed as a regression model based on one or more G2P prediction information elements as described above. For a given candidate word and the G2P prediction information generated for the candidate word, an annotation priority may be generated. The confidence processor 640 may receive the prediction performance model and determine the inputs to the prediction performance model. For example, the confidence model may include the G2P prediction information values needed to generate the annotation priority. The confidence processor 640 may then obtain the needed G2P prediction information values for the prediction for a candidate word. This may include parsing the output from the automatic pronunciation generator 630 to obtain and/or generate the inputs to the prediction performance model. The confidence processor 640 may be configured to store the annotation priority for a given pronunciation in the lexicon 152.

An active learning router 650 may be included in the pronunciation router 600. The active learning router 650 may be configured to determine whether a given candidate word should be provided to the automatic pronunciation generator 404 or the manual pronunciation generator 206. The active learning router 650 may further indicate a manual route for a candidate word as described, for example, in FIG. 4.

The active learning router 650 may receive ASR metrics 158 and annotation resource information 655. The ASR metrics 158 may include word frequency (e.g., how often a word was presented to the ASR module 156), word corrections (e.g., how often a "recognized" word was corrected by the user), skip words (e.g., words which were omitted from recognition) and the like. The annotation resource information 655 may include available annotators, annotator current work queue (e.g., words pending, word lengths, etc.), current bandwidth, current memory usage, threshold information (e.g., annotator threshold, bandwidth threshold, memory threshold), or the like.

Based on the received information, the active learning router 650 is configured to identify candidate words for manual pronunciation generation as described, for example, in FIG. 4 at block 414. The identification may be based on the annotation priority for a given word. The identification may be based on the ASR metrics for a given word. The active learning router 650 may be further configured to identify a manual annotation route for candidate words identified for manual annotation such as described in FIG. 4 block 416.

Execution Environment

Figure 7:
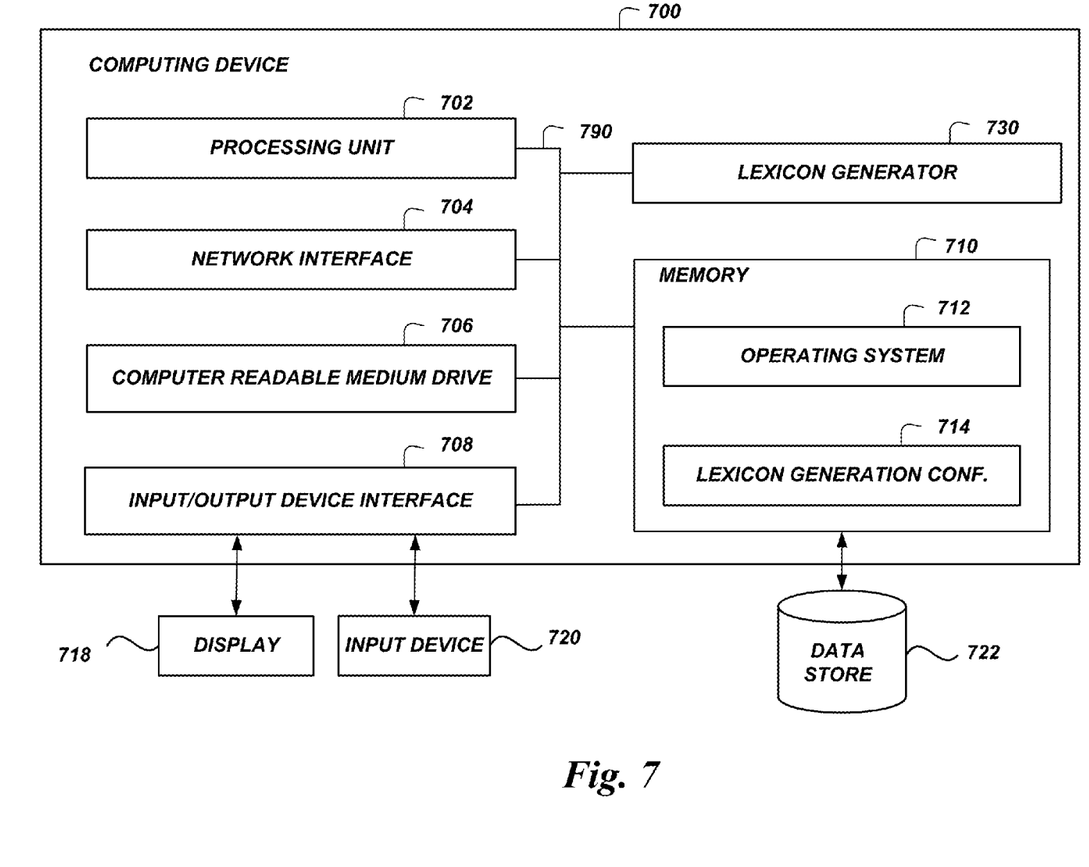
FIG. 7 is a functional block diagram of a computing device for active learning for lexical annotations.

FIG. 7 is a functional block diagram of a computing device for active learning for lexical annotations. The computing device 700 can be a server or other computing device, and can comprise a processing unit 702, a lexicon generator 730, a network interface 704, a computer readable medium drive 706, an input/output device interface 708, and a memory 710. The network interface 704 can provide connectivity to one or more networks or computing systems. The processing unit 704 can receive information and instructions from other computing systems or services via the network interface 704. The network interface 704 can also store data directly to memory 710. The processing unit 702 can communicate to and from memory 710 and output information to an optional display 718 via the input/output device interface 708. The input/output device interface 708 can also accept input from the optional input device 720, such as a keyboard, mouse, digital pen, microphone, mass storage device, etc.

The memory 710 contains computer program instructions that the processing unit 702 executes in order to implement one or more embodiments. The memory 710 generally includes RAM, ROM and/or other persistent, non-transitory computer readable media. The memory 710 can store an operating system 712 that provides computer program instructions for use by the processing unit 702 or other elements included in the computing device in the general administration and operation of the computing device 700. The memory 710 can further include computer program instructions and other information for implementing aspects of the present disclosure.

For example, in one embodiment, the memory 710 includes a lexicon generation configuration 714. The lexicon generation configuration 714 may include a word list for lexicon generation, a G2P model for automatic lexicon generation, annotation resources, thresholds, and/or ASR metrics as described above. The lexicon generation configuration 714 may store values for a given configuration. The lexicon generation configuration 714 may, in some implementations, store information for obtaining a given configuration. For example, the word list may be specified as a network location (e.g., URL) in conjunction with username and password information to access the word list. The memory 710 may also include or communicate with one or more auxiliary data stores, such as data store 722. The data store 722 may electronically store data regarding acoustic models, language models, training data for the acoustic and language models, G2P models, lexicons, and the like.

The elements included in the computing device 700 may be coupled by a bus 790. The bus 790 may be a data bus, communication bus, or other bus mechanism to enable the various components of the computing device 700 to exchange information.

In some embodiments, the computing device 700 may include additional or fewer components than are shown in FIG. 7. For example, a computing device 700 may include more than one processing unit 702 and computer readable medium drive 706. In another example, the computing device 702 may not be coupled to a display 718 or an input device 720. In some embodiments, two or more computing devices 500 may together form a computer system for executing features of the present disclosure. In some implementations, the lexicon generator 730 may be implemented in part with the processing unit 702.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more physical computer processors in communication with the computer-readable memory, wherein the one or more physical computer processors are programmed by the executable instructions to at least:
   automatically predict pronunciations using a grapheme-to-phoneme model for a list of words having manually provided pronunciations, wherein the grapheme-to-phoneme model is adapted to generate a predicted pronunciation and a confidence score for the predicted pronunciation based upon an input word;
   generate a prediction performance model for the grapheme-to-phoneme model based on:
      a comparison of automatically predicted pronunciations of the list of words with the manually provided pronunciations for the list of words, and confidence scores for the automatically predicted pronunciations, wherein the prediction performance model is adapted to generate performance information for the grapheme-to-phoneme model, the performance information indicating a degree of confidence in the grapheme-to-phoneme model to predict a new word added to the system based upon an input predicted pronunciation generated by the grapheme-to-phoneme model for the new word and the confidence score for the input predicted pronunciation generated by the grapheme-to-phoneme model;

receive an electronic record including candidate words to be added to an automatic speech recognition lexicon, the automatic speech recognition lexicon including words having the automatically predicted pronunciations generated by the grapheme-to-phoneme model;

generate, from the grapheme-to-phoneme model, a predicted pronunciation for a candidate word and a confidence score for a candidate word, wherein the candidate word is included in the candidate words;

generate, from the prediction performance model, an annotation priority for the candidate word based on the confidence score for the predicted pronunciation of the candidate word and the predicted pronunciation of the candidate word;

determine that the annotation priority for the candidate word exceeds a priority threshold; and route the candidate word to a manual pronunciation generator.

2. The system of claim 1, wherein a confidence score for a word is determined using one or more of: a character language model score, a phoneme language model score, a length of the word, or a predicted pronunciation length.

3. The system of claim 1, wherein the one or more physical computer processors are further programmed by the executable instructions to generate the prediction performance model by at least generating a performance regression model based on the manually provided pronunciation for the list of words, the predicted pronunciation for the list of words, and confidence scores for the list of words.

4. The system of claim 1, wherein the one or more physical computer processors are further programmed by the executable instructions to at least:

generate, from the prediction performance model, annotation priorities for predicted pronunciations of other candidate words based on the confidence scores for the predicted pronunciations of the other candidate words and the predicted pronunciations of the other candidate words; and determine that the annotation priority of the candidate word exceeds the annotation priorities of the other candidate words.

5. The system of claim 1, the one or more physical computer processors are further programmed by the executable instructions to at least receive automatic speech recognition metrics for the candidate word, wherein generating the annotation priority for the candidate word is further based on the received automatic speech recognition metrics for the candidate word.

6. The system of claim 5, wherein the automatic speech recognition metrics for a word includes linguistic frequency of the word within the lexicon, presentation frequency of the word to an automatic speech recognition system, skip rate of the word, or a correction rate for the word.

7. The system of claim 1, wherein the one or more physical computer processors are programmed by the executable instructions to route the candidate word by at least:

obtaining manual annotation resource information identifying an annotation resource; and generating a manual annotation route for the candidate word to the annotation resource based on the manual annotation resource information.

8. The system of claim 7, wherein the one or more physical computer processors are further programmed by the executable instructions to at least:

receive manually provided pronunciation information for the candidate word; and retrain the grapheme-to-phoneme model based on the generated manual pronunciation.

9. A computer-implemented method comprising:

under control of one or more computing devices configured with specific computer-executable instructions, generating a prediction performance model for a pronunciation prediction model based on:

a comparison of an automatically predicted pronunciation of a word with a manually provided pronunciation of the word, and confidence scores for the automatically predicted pronunciations, wherein the prediction performance model is adapted to generate performance information for a grapheme-to-phoneme model, the performance information indicating a degree of confidence in the grapheme-to-phoneme model to predict a new word added to a lexicon based upon an input predicted pronunciation generated by the grapheme-to-phoneme model for the new word and the confidence score for the input predicted pronunciation generated by the grapheme-to-phoneme model;

generating, from the pronunciation prediction model, a pronunciation prediction for a candidate word to be added to the lexicon and a confidence score for the candidate word;

generating, from the prediction performance model, an annotation priority for the candidate word based on the confidence score for the pronunciation prediction of the candidate word and the predicted pronunciation of the candidate word;

generating a value identifying a relationship between the annotation priority for the candidate word and a threshold; and routing the candidate word to one of a manual pronunciation generator or an automatic pronunciation generator based on the value.

10. The computer-implemented method of claim 9, wherein the pronunciation prediction model comprises a grapheme-to-phoneme model.

11. The computer-implemented method of claim 9, wherein a confidence score for a word is determined using one or more of: a character language model score, a phoneme language model score, a length of the word, or a predicted pronunciation length.

12. The computer-implemented method of claim 9, wherein generating the prediction performance model comprises generating a regression model based on the manually provided pronunciation for the word, the predicted pronunciation for the word, and a confidence score for the word.

13. The computer-implemented method of claim 9, wherein routing the candidate word comprises:

generating, from the prediction performance model, annotation priorities for predicted pronunciations of other candidate words based on the confidence scores for the predicted pronunciations of the other candidate words and the predicted pronunciations of the other candidate words; and determining that the annotation priority of the candidate word exceeds the annotation priorities of the other candidate words.

14. The computer-implemented method of claim 9, further comprising receiving automatic speech recognition metrics for the candidate word, wherein selecting a route for the candidate word is further based on the received automatic speech recognition metrics the candidate word.

15. The computer-implemented method of claim 14, wherein the automatic speech recognition metrics for a word includes linguistic frequency of the word within the lexicon, presentation frequency of the word to an automatic speech recognition system, skip rate of the word, or a correction rate for the word.

16. The computer-implemented method of claim 9, wherein the computer-implemented method further comprises receiving a manually provided pronunciation for the candidate word from the manual pronunciation generator.

17. The computer-implemented method of claim 16, further comprising retraining the pronunciation prediction model based on the received manually provided pronunciation.

18. The computer-implemented method of claim 16, further comprising:
    obtaining manual annotation resource information identifying an annotation resource; and
    generating a manual annotation route for the candidate word to the annotation resource based on the manual annotation resource information.

19. A non-transitory computer readable medium storing a computer-executable module that, when executed by a processor of a computing device, cause the computing device to perform a process comprising:
    generating a prediction performance model for a pronunciation prediction model based on:
        a comparison of an automatically predicted pronunciation of a word with a manually provided pronunciation of the word, and
            confidence scores for the automatically predicted pronunciations, wherein the prediction performance model is adapted to generate performance information for a grapheme-to-phoneme model, the performance information indicating a degree of confidence in the grapheme-to-phoneme model to predict a new word added to a lexicon based upon an input predicted pronunciation generated by the grapheme-to-phoneme model for the new word and the confidence score for the input predicted pronunciation generated by the grapheme-to-phoneme model;
    generating, from the pronunciation prediction model, a pronunciation prediction for a candidate word to be added to the lexicon and a confidence score for the candidate word;
    generating, from the prediction performance model, an annotation priority for the candidate word based on the confidence score for the pronunciation prediction of the candidate word and the predicted pronunciation of the candidate word;
    generating a value identifying a relationship between the annotation priority for the candidate word and a threshold; and
    routing the candidate word to one of a manual pronunciation generator or an automatic pronunciation generator based on the value.

20. The non-transitory computer readable medium of claim 19, wherein the computer-executable module causes the computing device to generate the pronunciation prediction model by generating a grapheme-to-phoneme model.

21. The non-transitory computer readable medium of claim 19, wherein the computer-executable module causes the computing device to determine a confidence score for a word using one or more of: a character language model score, a phoneme language model score, a length of the word, or a predicted pronunciation length.

22. The non-transitory computer readable medium of claim 19, wherein the computer-executable module causes the computing device to generate the prediction performance model by generating a regression model based on the manually provided pronunciation for the words, the predicted pronunciation for the words, and a confidence score for the word.

23. The non-transitory computer readable medium of claim 19, wherein the computer-executable module causes the computing device to selectively route the candidate word by causing the computing device to at least:
    generate, from the prediction performance model, annotation priorities for predicted pronunciations of other candidate words based on the confidence scores for the predicted pronunciations of the other candidate words and the predicted pronunciations of the other candidate words; and
    determine that the annotation priority of the candidate word exceeds the annotation priorities of the other candidate words.

24. The non-transitory computer readable medium of claim 19, wherein the computer-executable module further causes the computing device to receive automatic speech recognition metrics for the candidate word, wherein the computer-executable module causes the computing device to select a route for the candidate word based on the received automatic speech recognition metrics.

25. The non-transitory computer readable medium of claim 24, wherein the computer-executable module causes the computing device to receive automatic speech recognition metrics for a word that includes linguistic frequency of the word within the lexicon, presentation frequency of the word to an automatic speech recognition system, skip rate of the word, or a correction rate for the word.

26. The non-transitory computer readable medium of claim 19, wherein the wherein the computer-executable module further causes the computing device to receive a manually provided pronunciation for the candidate word from the manual pronunciation generator.

27. The non-transitory computer readable medium of claim 26, wherein the computer-executable module further causes the computing device to retrain the pronunciation prediction model based on the received manually provided pronunciation.

28. The non-transitory computer readable medium of claim 26, wherein the computer-executable module further causes the computing device to:
    obtain manual annotation resource information identifying an annotation resource; and
    generate a manual annotation route for the candidate word to the annotation resource based on the manual annotation resource information.

* * * * *

UNITED STATES PATENT AND TRADEMARK OFFICE
CERTIFICATE OF CORRECTION

PATENT NO. : 9,508,341 B1  
APPLICATION NO. : 14/476075  
DATED : November 29, 2016  
INVENTOR(S) : Parlikar et al.

Page 1 of 1

It is certified that error appears in the above-identified patent and that said Letters Patent is hereby corrected as shown below:

In the Specification

In Column 1 at Line 48, After "disclosure" insert --.--.

In the Claims

In Column 17 at Line 5, In Claim 14, after "metrics" insert --for--.

In Column 18 at Line 45 (approx.), In Claim 26, change "wherein the wherein the" to --wherein the--.

Signed and Sealed this  
Fourth Day of April, 2017

Michelle K. Lee  
*Director of the United States Patent and Trademark Office*